Nov. 20, 1951     F. S. RETTINGER     2,575,596
TOW BAR
Filed Dec. 6, 1948     2 SHEETS—SHEET 2
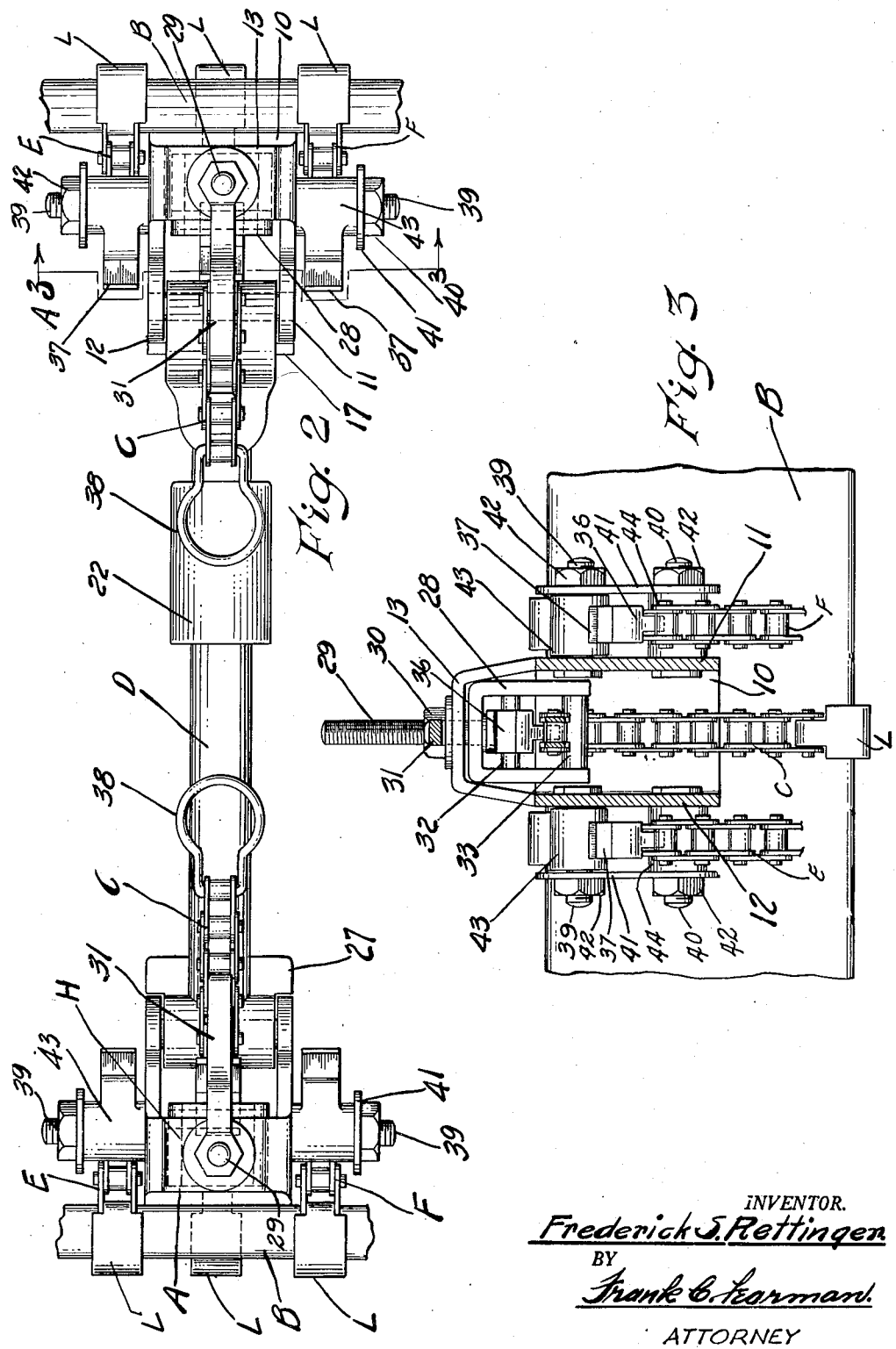
INVENTOR.
*Frederick S. Rettinger*
BY
*Frank C. Fearman*
ATTORNEY Patented Nov. 20, 1951

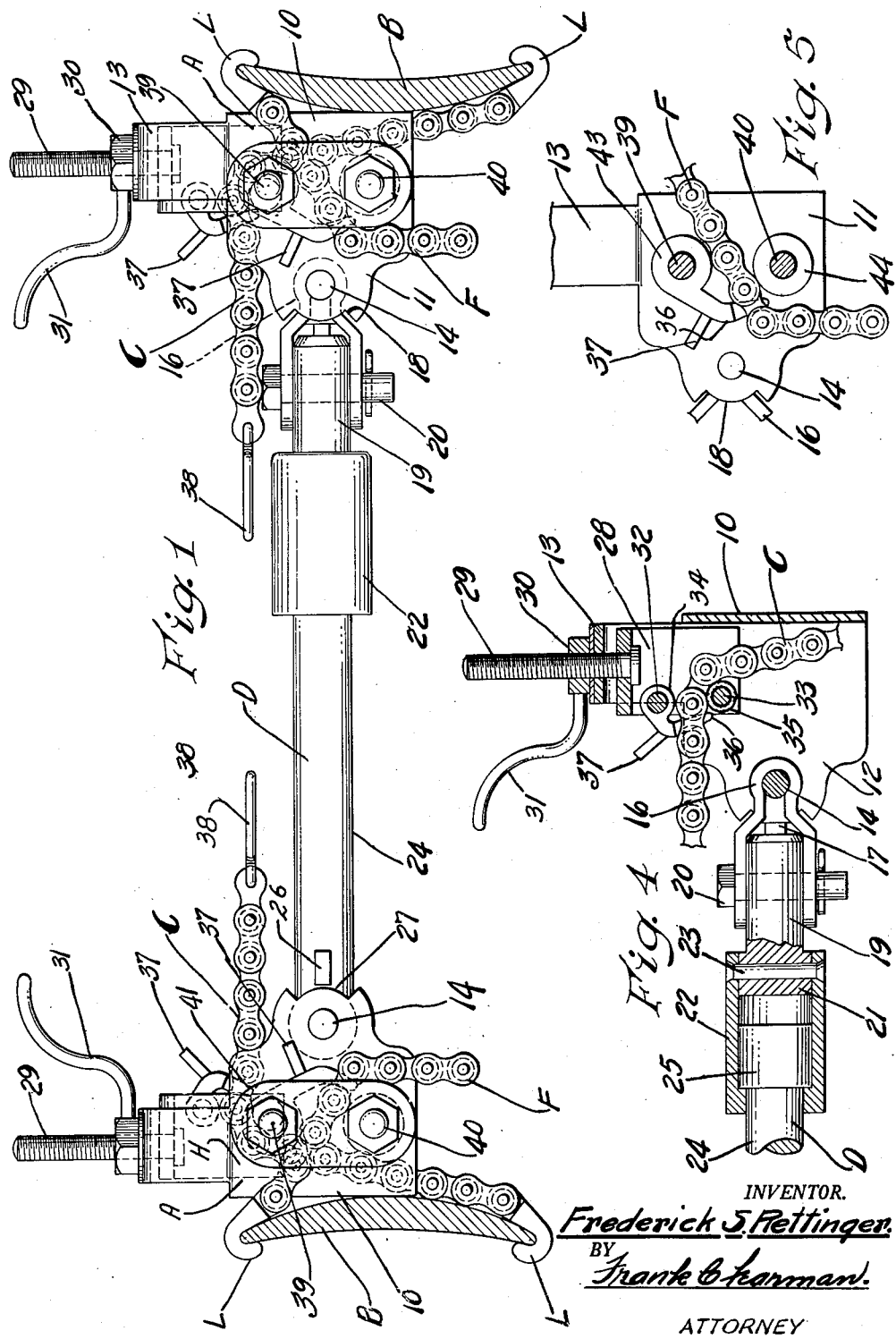

2,575,596

UNITED STATES PATENT OFFICE 2,575,596

TOW BAR

Frederick S. Rettinger, Battle Creek, Mich., assignor to Caro Manufacturing Co., Caro, Mich.

Application December 6, 1948, Serial No. 63,660

6 Claims. (Cl. 280—33.14)

This invention relates to tow bars such as utilized to couple a trailer or other vehicle to the bumper of an automobile.

One of the prime objects of the invention is to design a relatively simple, practical, and substantial tow bar which can be easily and quickly connected to and/or disconnected from the bumpers of vehicles, so that only the driver will be needed to conveniently tow a vehicle.

Another object is to provide a tow bar provided with coupling heads, and flexible means for ready adjustment to the bumpers of a vehicle, and provide means for tensioning said flexible means for securing it in adjusted position.

A further object is to design an attachment tow bar which is adjustable to fit bumpers of various sizes, widths, and shapes, and which permits of universal movement in any direction, to the end that the towed vehicle may ride over rough roads and terrain without binding, clamping, or otherwise interfering with the conventional operation of the vehicle.

Still a further object is to provide a coupling means including link chains or flexible means engageable with the bumpers, together with releasable dogs associated therewith for engaging and securing said chains in set position.

A further object still is to provide a tow bar including means for limiting the swinging action of the coupling heads with relation to the bar.

Still a further object is to provide a draft bar so designed that it can be readily connected and/or disconnected without the use of special tools, and without boring holes in or otherwise defacing the bumper.

A further object still is to provide a tow bar composed of relatively few parts all of which are of simple, sturdy construction, and which can be readily manufactured and assembled.

To the accomplishment of the foregoing and related ends, said invention then consists of the means hereinafter more fully described, and particularly pointed out in the appended claims, the annexed drawings and following description setting forth, in detail, certain means and one mode of carrying out the invention, such disclosed means and mode illustrating, however, but one of the various ways in which the principle of the invention may be used.

In the drawings:

Fig. 1 is a side-elevational view of my tow bar showing it attached to the bumpers which are shown in cross section.

Fig. 2 is a top, plan view thereof.

Fig. 3 is a vertical, sectional view of the coupling head taken on the line 3—3 of Fig. 2.

Fig. 4 is a fragmentary, transverse-sectional view of the coupling head and bar.

Fig. 5 is a fragmentary, part-sectional, side view of one of the side plates, illustrating the dog in engagement with one of the chain links.

Referring now more specifically to the drawings in which I have shown the preferred embodiment of my invention, the letter A indicates a preferably pressed steel plate housing or coupling element formed with front and side walls 10, 11 and 12 respectively, with a yoke section 13 formed integral therewith and projecting upwardly therefrom.

The side walls 11 and 12 of the housing A project rearwardly as shown, and a horizontally disposed pin 14 spans said walls, the closed end of a clevis member 16 being revolvably connected to said pin and is provided with laterally projecting ears or stops 17 which engage cut-out sectors 18 provided in the ends of the side plates to limit the pivotal movement of the housing with relation thereto.

The open end of the clevis extends rearwardly as shown and is spread to accommodate a bar section which forms a part of the draw bar D, and a pin 20 serves to connect the open end of the clevis thereto, the enlarged shouldered end 21 of the bar section being accommodated in a sleeve 22, and a pin 23 serves to secure it in position, the closed end of the clevis 16 providing pivotal movement in a horizontal plane, while the pin 20 provides for movement in a vertical plane.

The main section 24 of the draw bar D is mounted in the opposite end of the sleeve 22, the end being shouldered as at 25 to provide a substantial, revolvable connection thereat. A similar coupling element or housing assembly H is connected to the opposite end of the draw bar 24, and laterally projecting stops 26 are formed thereon to engage cut-out sectors 27 provided in the side plate in substantially the same manner as previously described, and for the same purpose.

A vertically adjustable U-shaped bracket 28 is mounted in the housing A, and a threaded bolt 29 extends therethrough and through the yoke section 13, the head of the bolt bearing against the bracket 28, and a nut 30 is provided on the upper end of said bolt, with a laterally extending handle 31 provided on the nut for easy manipulation thereof.

Vertically disposed pins 32 and 33 span the depending legs of the bracket 28, and rollers 34 and 35 are revolvably mounted thereon, a laterally projecting bill-shaped dog 36 being formed on the roller 35 as clearly shown in Fig. 4 of the drawings, and an upwardly extending arm 37 is provided for easy and convenient manipulation of said dog.

A roller chain C is threaded through the space between the rollers 34 and 35 and a hook-shaped link L is provided on the one end as shown, for releasable engagement with the lower edge of a conventional automobile bumper B.

A ring 38 is provided on the free end of the chain C and presents an easy finger hold for drawing the chain taut after it has been attached to the bumper, and the dog 36 is then swung down into engagement with one of the chain links for securing the chain in position.

Laterally projecting, vertically spaced bolts 39 and 40 are mounted on the side walls of the housing A, and a plate 41 connects the outer ends of the bolts, nuts 42 being provided on the threaded ends of the bolts, and rollers 43 and 44 similar to those on the bracket 28 are journaled on said bolts, the member 43 being formed with a dog 36, and an arm 37 for engaging a link chain as above described.

It will be noted that the assembly on the opposite side of the housing A is exactly the same, and chains E and F are accommodated between the rollers 43 and 44, and hook-shaped links L are provided on the ends thereof for engagement with the upper edge of the bumper B, and a ring 38 is provided on the free end of each chain for drawing the chains taut after they have been attached, after which the dogs 36 are swung down into interlocking engagement with the chains.

When it is desired to attach the tow bar to the bumper of a vehicle, the handle 31 is first manipulated to lower the bracket 28 and provide ample slack in the chains; the hook-shaped links L are then hooked to the upper and lower edges of the bumper, after which the operator grasps the rings 38 to pull the chains taut, and the dogs 36 are then swung downwardly into engagement with the chains to hold them taut.

Obviously, there will still be slack in the chains and this is taken up by manipulation of the handle 31 to draw the bracket 28 upwardly, thus tightening the chains and tensioning the entire assembly, so that the hook links L are firmly secured in the bumper B. The stops 17 and 26 are accommodated in the sectors 18 and 27 and provide for limited swinging movement of each housing assembly with relation to the draw bar, and the entire structure has the necessary flexibility to compensate for relative movement of the vehicles when traveling over rough terrain, turning corners, or other conventional operation.

Release is effected by merely turning the handle 31 to lower the bracket 28 to the point where the dogs 36 can be swung upwardly, and the hook-shaped links disengaged.

The device is simple, practical, rugged and economical, and can be very easily and quickly attached and/or detached.

From the foregoing description, it will be obvious that I have perfected a very simple, practical tow bar for attaching and towing vehicles of all kinds.

What I claim is:

1. A towing device of the class described, comprising a coupling head adapted to be secured to an automobile bumper, a vertically adjustable U-shaped bracket mounted on said head, a chain accommodating passage therein, a flexible chain threaded therethrough and detachably secured to the lower edge of the bumper, similar chain accommodating passages provided on the side walls of the coupling head, chains leading therethrough and detachably secured to the upper edge of the bumper, and means for vertically adjusting said bracket to tension said chains.

2. A towing device of the character described comprising, a coupling head adapted to be secured to an automobile bumper, said head having a vertically adjustable bracket member adjustably supported in said head, spaced-apart, horizontal pins in said bracket, rollers journaled on said pins and forming a chain passage therebetween, a chain threaded through said passage and releasably connected to the bottom edge of a bumper, a dog provided on one of said rollers and releasably engageable with a selected link of the chain for securing it in adjusted position, similarly formed chain passages provided on the side walls of the head element, chains leading therethrough and releasably connected to the upper edge of the bumper, and means for adjusting said bracket to tension said chains.

3. The combination set forth in claim 2 in which cut-out sectors are provided in the head and stops on said sectors for limiting the pivotal movement of a draw bar with relation to said head.

4. The combination defined in claim 2 in which the coupling head comprises front and side walls, a yoke-shaped section formed integral therewith, a bracket suspended in said head, adjusting means extending through said yoke and connected to said bracket, and a handle for actuating said adjusting means.

5. A towing device of the class described comprising a coupling head adapted to be secured to an automobile bumper, a vertically adjustable U-shaped bracket mounted on said head, a chain-accommodating passage therein, revoluble members forming the upper and lower walls of said passage, a flexible chain threaded through said passage and detachably secured to the lower edge of the bumper, a laterally projecting dog on one of said members for releasable engagement with one of the links of the chain, similar chain-accommodating passages provided on the side walls of the coupling head, chains leading therethrough and detachably secured to the upper edge of the bumper, and means for vertically adjusting said bracket to tension said chains.

6. A towing device of the class described comprising a coupling head adapted to be secured to an automobile bumper, said head comprising a pressed plate housing having an upwardly projecting yoke section formed integral therewith, a vertically adjustable U-shaped bracket mounted on said head, a chain-accommodating passage therein, a threaded adjustable member extending through said yoke section and on which the adjustable bracket is carried, similar chain-accommodating passages provided on the side walls of the coupling head, chains leading therethrough and detachably secured to the upper edge of the bumper, and means for vertically adjusting said bracket to tension said chains.

FREDERICK S. RETTINGER.

REFERENCES CITED

The following references are of record in the file of this patent:

UNITED STATES PATENTS

| Number | Name | Date |
|---|---|---|
| 2,268,181 | Bolton | Dec. 30, 1941 |
| 2,440,877 | Russell | May 4, 1948 |
| 2,446,218 | Dunlap | Aug. 3, 1948 |